Nov. 27, 1962  D. F. BASCOM  3,065,563
SPORTS DEVICE
Filed July 17, 1961
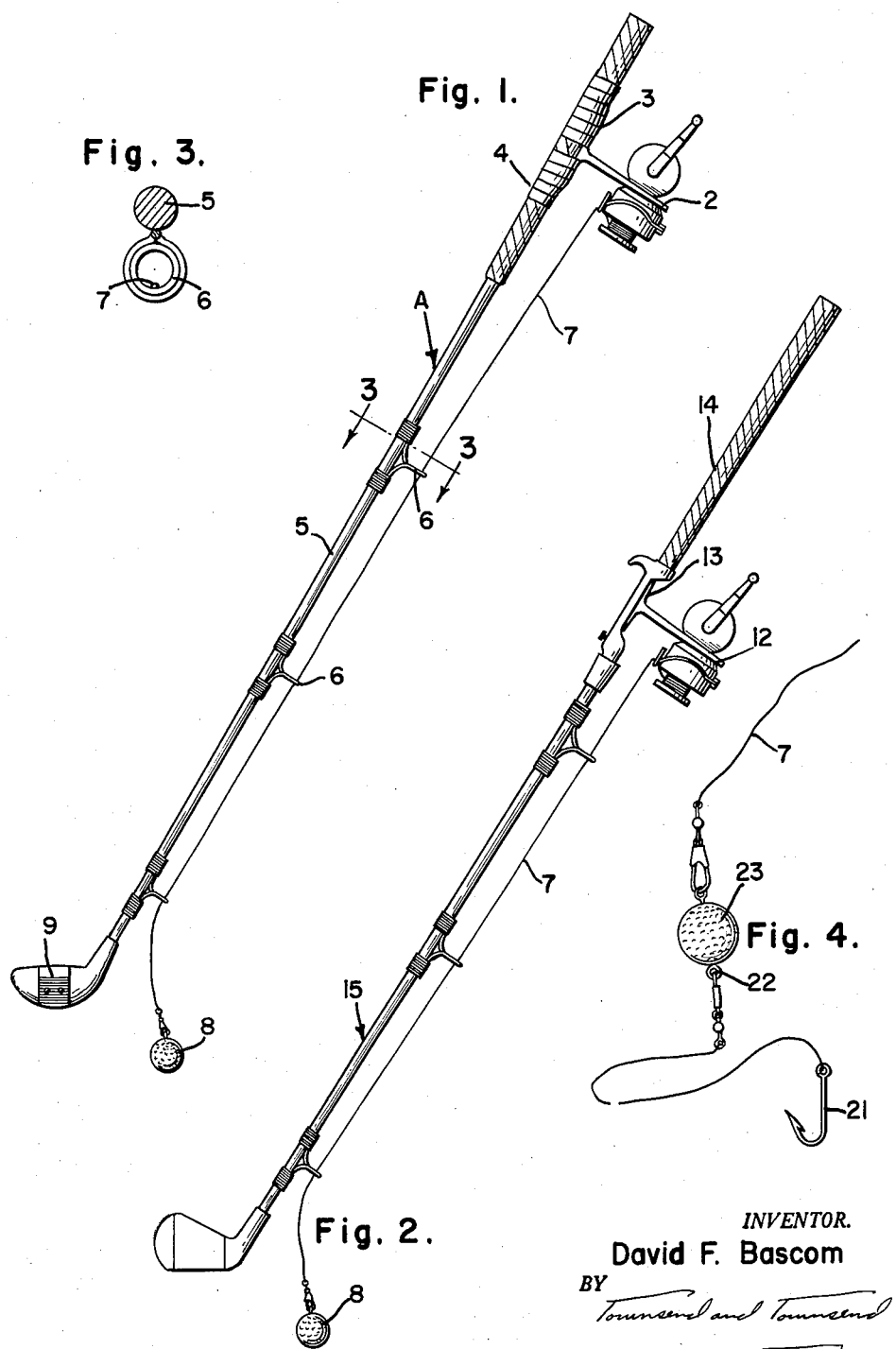
INVENTOR.
David F. Bascom
BY
Townsend and Townsend
attorneys 3,065,563
SPORTS DEVICE
David F. Bascom, 8 Aztec Way, Oakland, Calif.
Filed July 17, 1961, Ser. No. 124,565
4 Claims. (Cl. 43—19)

This invention relates to a sports device and more particularly to a combination golf club and fishing rod.

The invention combines a conventional spinning reel with a golf club and wherein the free end of the line carried by the spinning reel is provided with a golf ball. The uses to which the novel device may be put are numerous and varied in type and kind. For example, the club may be used as a practice device to hit the ball which, in turn, takes out line commensurate with the shot. The reel may then be used to retrieve the ball for further shot making. The club may be of any desired type such as a driver for hitting for distance or, for example, the club may be in the form of a putter. As an amusement device it may be employed indoors with a putter and simulated hole.

Again, its versatility is exemplified by the fact that a fish hook may be attached to the ball and the ball may be struck by the club outwardly over a body of water a very considerable distance and as the ball and attached hook are retrieved by operation of the spinning reel a substantial area of water is thusly traversed which might otherwise be extremely difficult to reach by conventional casting methods.

Other uses of the sports device will become apparent upon reference to the accompanying specification and claims in which similar characters of reference represent corresponding parts in the several views.

FIG. 1 is a plan view showing a spinning reel attached to a driver.

FIG. 2 shows a spinning reel attached to a putter.

FIG. 3 is a sectional view taken along line 3—3 of FIG. 1.

FIG. 4 shows a ball equipped with a fishing hook.

The essence of the invention is the provision of a fishing reel, preferably in the form of a spinning reel, mounted upon a golf club in such a fashion that a ball attached to the free end of the line contained on the reel may be struck by the head of the club and thence retrieved. Preferably, leader material such as light weight monofilament nylon line is carried by the spinning reel and because of the nature of spinning reels and the light weight line employed there is very little drag or interference from the reel or line when the ball is struck by the club head.

As indicated in the drawings, FIG. 1 shows a preferred form of the invention wherein a golf club in the form of a driver is indicated at A and shows a conventional spinning reel 2 mounted as at 3 on the handle 4 of the club. The conventional spinning reel may be of either the open or closed face type and equipped with a line spool and winding handle. A typical closed face spinning reel is illustrated by United States patent to Denison et al. No. 2,828,088 dated March 25, 1958. An open face spinning reel is indicated by United States Patent No. 2,600,558 dated June 17, 1952. The shank 5 carries spaced line eyes 6 through which the line 7 is threaded in order to guide the line. The free end of the line 7 is attached to a golf ball 8. When the line is in retrieved position the ball 8 is in closed juxtaposition to the head 9 of the club by reason of the positioning of line eyes 6.

In operation the spinning reel is actuated open to allow the line to flow freely from the line spool. The club is swung in conventional fashion to strike the ball and send it on its flight. When the ball lands it may then be retrieved by operating the handle of the reel to reel in the line. One of the advantages of the use of this device as noted is that an accurate measurement of the length of the drive may be obtained by noting the amount of line expended.

The position of the reel with reference to the position of the handle of the club may be varied, as illustrated in reference to FIG. 2. In FIG. 2 the conventional spinning reel 12 is mounted removably as at 13 below the handle 14 of the club 15, which is illustrated as a putter.

The means by which the free end of the line is attached to the ball may be varied as by an adhesive attachment, mechanical staple, or combination thereof, or, alternatively, the line may be built into the ball at the time of manufacture.

The modification of FIG. 4 illustrates a fishing hook 21 which may be provided with a lure, if desired, which is secured, as at 22, to the ball 23 in any suitable fashion. In this connection, the ball may be formed to act as a bob or may act as a weight or sinker, dependent upon the material from which it is formed and its degree of buoyancy or lack thereof.

The possible modifications of construction and/or assembly of the parts may be varied in accordance with the desires of the user and the intended use of the device. The position of the reel in reference to the club, the type of club and the type of ball or other object to be struck by the club head are all obvious variables which may be modified as desired.

The invention has been illustrated and explained by way of example and it is to be understood that the various parts and assembly thereof may be modified as limited only by the spirit and scope of the appended claims.

I claim:

1. A combination fishing rod and golf club comprising a golf club having head and handle ends, and a shank portion therebetween, a spinning reel containing a spool of line mounted on the golf club adjacent the handle end thereof, guide means carried by the golf club to guide line carried by the spinning reel in linear relationship to the shank, and an article attached to the free end of said line adapted to be struck by the head of the golf club, said article being positioned by said guide means so as to be located adjacent said head when said line is in fully reeled condition.

2. A combination fishing rod and golf club in accordance with claim 1 and wherein the article carried by the free end of the line is a ball.

3. A combination fishing rod and golf club in accordance with claim 1 and wherein the article carried by the free end of the line is a ball having at least one attached fish hook.

4. A combination golf club and spinning reel comprising an integral golf club having head and handle ends and a shank portion therebetween, a spinning reel mounted upon said golf club adjacent the handle end thereof, said reel having a spool of flexible line, guide means carried by the golf club to guide line contained in said reel toward the club head linearly of said golf club and spaced laterally of said shank portion, and a ball carried by the free end of said line, said guide means positioned to locate the ball adjacent to the club head when the line is in fully spooled condition.

References Cited in the file of this patent

UNITED STATES PATENTS

| | | |
|---|---|---|
| 706,225 | Ekelund | Aug. 5, 1902 |
| 2,128,610 | Heimers | Aug. 30, 1938 |
| 2,482,015 | McConnell | Sept. 13, 1949 |
| 2,714,009 | Noland | July 26, 1955 |

OTHER REFERENCES

Zern: Field and Stream Magazine, January 1961, pg. 96.